United States Patent
Yamaguchi et al.

[19]

[11] Patent Number: 6,064,996
[45] Date of Patent: May 16, 2000

[54] EVOLUTIONARY CONTROLLING SYSTEM WITH BEHAVIORAL SIMULATION

[75] Inventors: Masashi Yamaguchi; Ichikai Kamihira, both of Iwata, Japan

[73] Assignee: Yamaha Hatsudoki Kabushiki Kaisha, Shizuoka-ken, Japan

[21] Appl. No.: 08/939,316

[22] Filed: Sep. 29, 1997

[30] Foreign Application Priority Data

Sep. 27, 1996 [JP] Japan ................................. 8-256884

[51] Int. Cl.$^7$ ............................... G06N 3/00; G06N 3/12
[52] U.S. Cl. ............................................. 706/13; 706/20
[58] Field of Search ................................................ 706/13

[56] References Cited

U.S. PATENT DOCUMENTS

| | | | |
|---|---|---|---|
| 4,697,242 | 9/1987 | Holland et al. | 706/13 |
| 5,041,976 | 8/1991 | Marko et al. | 701/29 |
| 5,140,530 | 8/1992 | Guha et al. | 706/13 |
| 5,200,900 | 4/1993 | Adrain et al. | 701/115 |
| 5,293,317 | 3/1994 | Adrain et al. | 701/115 |
| 5,361,213 | 11/1994 | Fujieda et al. | 701/111 |
| 5,361,628 | 11/1994 | Marko et al. | 73/116 |
| 5,657,737 | 8/1997 | Ishida et al. | 123/674 |
| 5,745,653 | 4/1998 | Jesion et al. | 706/23 |
| 5,781,700 | 2/1996 | Puskorius et al. | 706/14 |
| 5,877,954 | 5/1996 | Klimasauskas et al. | 364/149 |

OTHER PUBLICATIONS

Valluru B. Rao and Hayagriva V. Rao, C++ Neural Networks and Fuzzy Logic 82–86, 1993.

Raed Abu Zitar and Mohamad H. Hassoun, Neurocontrollers Trained with Rules Extracted by a Genetic Assisted Reinforcement Learning System, 6 IEEE Transactions on Neural Networks 859–79, Jul. 1995.

Arpad Keleman et al., Run–Time Autotuning of a Robot Controller Using a Genetics Based Machine Learning Control Scheme, 1995 First International Conference on Genetic Algorithms in Engineering Systems 307–12, Sep. 1993.

*Primary Examiner*—Tariq R. Hafiz
*Assistant Examiner*—Michael Pender
*Attorney, Agent, or Firm*—Knobbe, Martens, Olson & Bear, LLP

[57] ABSTRACT

An evolutionary control for a subject such as an engine installed in a vehicle is conducted by the steps of: selecting coefficients, as genes, affecting the control characteristics of the control system; creating plural control units as chromosomes, each being constituted by plural genes; expressing the genes of each chromosome as control characteristics by conducting behavioral simulation on each chromosome; selecting at least one chromosome from the created chromosomes based on the result of the behavioral simulation; and causing the at least one chromosome to evolve using a genetic algorithm, thereby obtaining control characteristics suitable for the user. In this method, the characteristics of the product can easily be adjusted after its purchase.

6 Claims, 17 Drawing Sheets

Torque is high at low-medium speed but not at high speed, and fuel efficiency is low.

High-speed torque
Medium-speed torque
Low-speed torque

Fuel efficiency is very good; but torque is low at all speeds.

Both torque and fuel efficiency are reasonable.

EVOLUTIONARY CONTROLLING SYSTEM WITH BEHAVIORAL SIMULATION

BACKGROUND OF THE INVENTION

This invention relates to an evolutionary controlling system, and particularly to that for controlling characteristics of a subject in an evolutionary manner.

Heretofore, when a control system or control characteristics of a subject, such as vehicles and electrical appliances, is designed, imaginary users are selected, and the users' preferences and their using conditions are taken into consideration. The characteristics of the subject are determined in such a way as to adapt the subject to users in as broad a range as possible.

However, each individual user has a particular and unique personality, and thus, their preferences are diverse. Thus, there is a problem in that even if imaginary users are selected to develop and design a product for users by presuming the users' preference, it is impossible to satisfy all of the users of the product.

In order to solve the above problem, prior to purchase of a product, a prospective user is requested to determine whether or not the product is satisfactory to the user after checking the characteristics of the product in light of the user's preferences. However, it is troublesome for the user to check the characteristics of the product before purchase. Further, because a series of products are often operated or controlled by characteristics common in the products, although the design of the product is changed depending on the user's preferences, the user may not like other operational characteristics. Thus, although the design is appealing to some prospective users, the users may not purchase the product since the operational characteristics do not appeal to them. In other words, there is another problem in that the range of users is limited and depends on the operational characteristics.

An objective of the present invention is to provide an evolutionary control system to construct characteristics which can satisfy plural users.

SUMMARY OF THE INVENTION

One important aspect of the present invention attaining the above objective is a method for evolutionally controlling a subject based on a user's preference by using a control system having control characteristics, comprising the steps of: selecting coefficients, as genes, affecting the control characteristics of the control system; creating plural control units as chromosomes, each being constituted by plural genes; expressing the genes of each chromosome as control characteristics by controlling the subject using the control system having the control characteristics; selecting at least one chromosome from the created chromosomes based on the control characteristics expressed by the genes in view of the user's preference; and causing said at least one chromosome to evolve by repeating the creating step, the expressing step, and the selecting step, while causing cross-over and mutation of the genes, until the control system obtains control characteristics suitable for the user.

In the above, since plural chromosomes are created using coefficients affecting the control characteristics of the control system controlling the characteristics of a product to be controlled, and the chromosomes are subjected to selection based on the user's instructions resulting from behavioral simulation conducted on each chromosome, thereby causing the chromosomes to undergo evolution using a genetic algorithm, any given characteristics of the product can be set through behavioral simulation, i.e., characteristics satisfying each user can individually be achieved. In addition, since a genetic algorithm is used as means for effecting evolution, evolution of the subject can efficiently be achieved. Further, since evaluation of results from the genetic algorithm is conducted by behavioral simulation, actual operation of the subject is eliminated during evolution, thereby easing and facilitating evolution of the subject.

In the above, since the user can perform selection of the chromosomes, the characteristics of a product to be controlled can be changed in accordance with the user's preference after shipment, i.e., a customized or user-friendly product most suitable to each user can be supplied. Further, since the characteristics of the product can be changed in accordance with the user's intention, the user can give less weight to the initial characteristics of the product itself, and can select a product from a wide range at purchase. Further, the user can "train" a product to ease control of the subject particularly for the user, and enjoy training and adapting the product to the user's preference.

When the evolution-simulation is conducted using an external device, no limitation is imposed on the location of the product, and evolution processing can be conducted anywhere the user likes.

When a personal computer commonly owned in a household is used as the external device, the use of a costly specially-designed simulation device is eliminated.

When the user refers to data for evolution processing, the user's role in selection can be reduced.

In the foregoing, the user can retrieve any preferable characteristics stored in a memory at any time, thereby quickly changing the behavioral characteristics of the subject depending on the feeling of the user or the environment.

When the subject to be controlled is an engine for a vehicle, the characteristics of the engine can be changed to suit the user's preferences, thereby obtaining characteristics of the engine most suitable to each individual user.

When the subject to be controlled is a suspension system or seat, the characteristics of the damper of the suspension system or seat can be changed to suit the user's preferences, thereby obtaining characteristics of the damper most suitable to each individual user.

When the subject to be controlled is an auxiliary power unit installed in a bicycle or a wheelchair, the characteristics of the auxiliary power unit (motor) can be changed to suit the user's preferences, thereby effecting assistance most customized to each individual user.

When the subject to be controlled is a personal robot, the behavioral characteristics of the robot can be changed to suit the user's preferences, thereby obtaining behavioral characteristics of the robot most suitable to each individual user.

When external devices for evaluation of evolution processing are linked among users via a communication network, it is possible to increase the processing speed of evaluating fitness of individuals by conducting parallel processing of each individual. Further, since the number of individuals increases, diversity of individuals can be improved, leading to better evolution. In addition, evaluation results can jointly be owned among users, and can easily be used.

In the above, when plural chromosomes are created using coefficients affecting the control characteristics of the control system controlling the characteristics of a product to be controlled, and the chromosomes are subjected to selection based on the user's instructions resulting either from behavioral simulation conducted on each chromosome or from actual operation, thereby causing the chromosomes to undergo evolution using a genetic algorithm, the user can choose evolution processes either based on simulation results from behavioral simulation or based on behavioral results from actual operation of the subject, thereby allowing for evolution control in accordance with the user's preference.

In addition, when the control system comprises neural networks learning relationships among the control characteristics using coupling coefficients, and the coefficients used as the genes are the coupling coefficients, the creating step can readily be performed.

The present invention can be applied not only to a method but also to a system. An appropriate system can be constructed accordingly. In addition, although the present invention can advantageously and preferably be applied to an engine, it can be applied to other machines as described above.

DETAILED DESCRIPTION OF THE PREFERRED EMBODIMENT

The evolutionary control system of the present invention will be explained further with reference to an embodiment shown in the figures described below.

Outline of Evolutionary Control System

Figure 1:
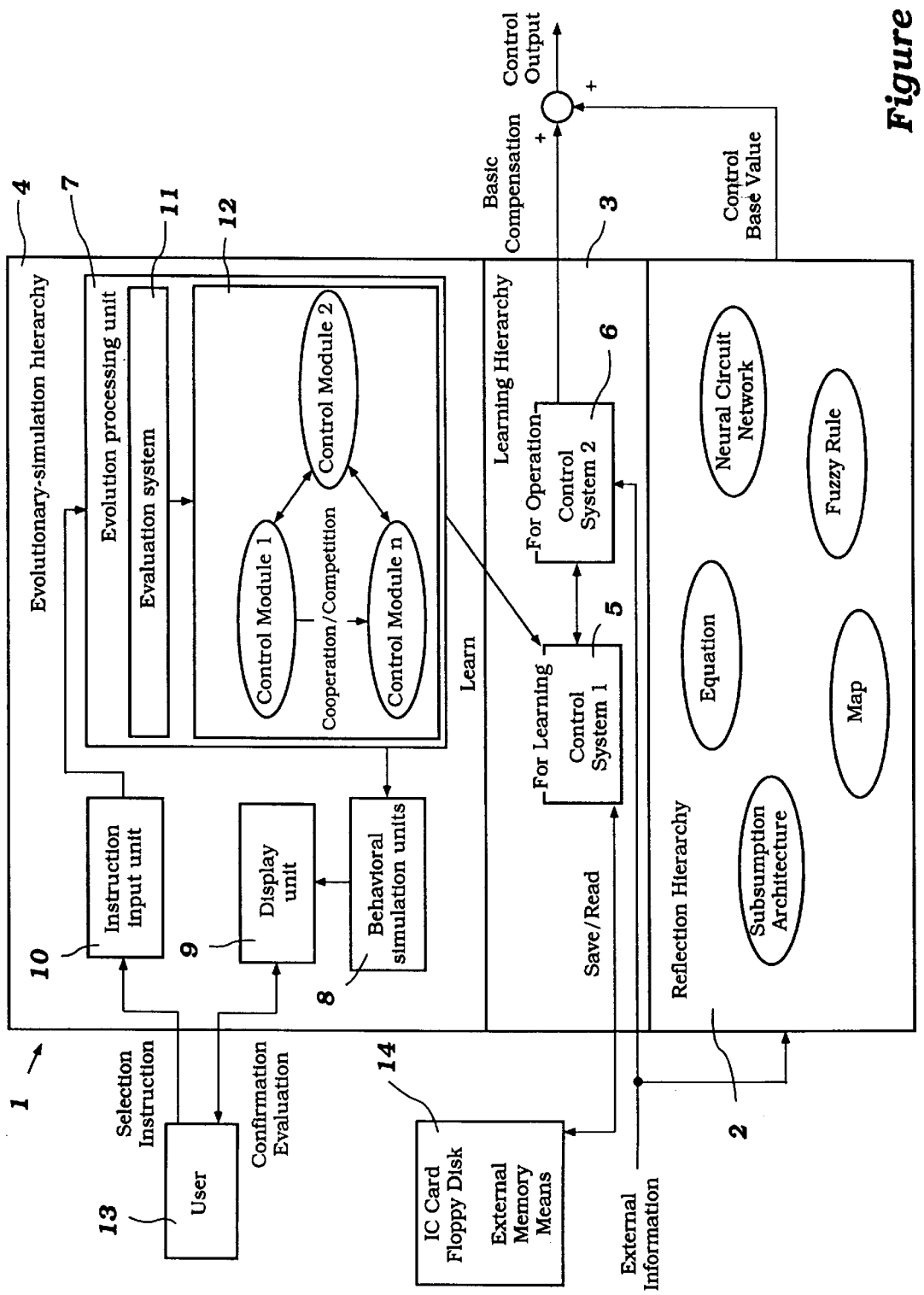
FIG. 1 is a block diagram showing the basic principle of an evolutionary control system according to the present invention.

FIG. 1 is a block diagram showing the basic principle of an evolutionary control system 1 (control unit) according to the present invention. As shown in FIG. 1, the evolutionary control system 1 of this embodiment has three hierarchies (layers), i.e., a reflection hierarchy (layer) 2, a learning hierarchy (layer)3 , and an evolution-simulation hierarchy (layer) 4, into which information related to the subject to be controlled, such as that related to a dynamic state, is input. Based on the information, a control base value is determined in the reflection hierarchy 2, compensations for the control base value are determined in the learning hierarchy 3, and based on the control base value and the compensations, a control output is determined in the evolution-simulation hierarchy 4. The evolution-simulation hierarchy 4 conducts behavioral simulation of the subject to be controlled in accordance with the user's instructions, thereby generating a control module most suitable for a user's preference, and then causing the learning hierarchy 3 to learn the most suitable control module.

The functions of each means for effecting an evolutionary controlling system 1 will be explained.

The reflection hierarchy is a hierarchy installing a relationship between information related to operational states of the subject to be controlled (hereinafter referred to as external information) and a control base value for the external information, in a control system such as in the form of equations, maps, fuzzy rules, a neural network, or subsumption architecture. When the external information is input thereinto, a control base value is determined for the external information input from the control system. The above subsumption architecture is known to be a behavioral artificial intelligence which conducts parallel processing.

The learning hierarchy 3 is comprised of two control systems mutually switchable, one for learning 5 and the other for operation 6. While the control system for operation 6 operates control, the control system for learning 5 learns the relationship of input and output regarding the most suitably evolved control module in the evolution-simulation hierarchy 4. After completing the learning 5 in the control system for learning, the control system operating control and the control system that has finished learning are switched over, whereby the control system after learning starts operating control using a control module obtained from the learning, whereas the control system previously operating control starts functioning as a control system for learning.

Incidentally, the control system in the learning hierarchy is set so as to output zero at the beginning, i.e., control is conducted by the output of the reflection hierarchy at the beginning.

The evolution-simulation hierarchy 4 is comprised of an evolution processing unit, a behavioral simulation unit 8, a display unit 9, and an instruction input unit 10. The evolution-simulation unit 7 is comprised of an evaluation system 11 and an evolution-fitness system 12. The evolution-fitness system 24 comprises at least one control module, which undergoes evolution in response to instructions from the evaluation system 11, using a genetic algorithm. The control module evolved through the genetic algorithm is simulated by the behavioral simulation unit 8, and a result of the simulation is displayed on the display unit. The user 13 evaluates the result of the simulation, and inputs the evaluated result into the evaluation system of the evolution-processing unit 7 via the instruction input unit. The evaluation system 11 causes the control module(s) of the evolution-fitness system 12 to further evolve in accordance with the evaluated result. While or upon repeating the above cycle, the evolution-simulation hierarchy 4 obtains a control module most suitable at the moment, and causes a control system for learning 5 of the learning hierarchy 3 to learn the result. In the above, each control module is one unit having a control system, which conducts integrated control. In the above, behavioral simulation can be conducted, for example, using a relationship between input, such as the injection time period of an injector, the ignition timing of a ignition plug, and the valuing timing of an intake valve, and output such as the torque and fuel efficiency. A simulation program can easily be established in advance.

In the learning hierarchy 3, the information related to the after-learning control-module of the learning hierarchy 3 is readably saved in external memory means 14 such as an IC card and a floppy disk. The user can pull out the information related to the most suitable control module in the past from the external memory means 14, according to the user's need, and the user can thereby output a basic compensation from the learning hierarchy 3 based on the information.

According to the evolutionary controlling system 1 described above, by the function of each means, the control output changes with time in accordance with the user's intention, and as a result, the characteristics of the subject to be controlled change with time in accordance with the user's intention. In the present invention, the state, wherein the characteristics of the subject evolve to suit them to the characteristics of the user and/or the using conditions, is referred to as "training".

Control Flow of Evolutionary Control System

Figure 2:
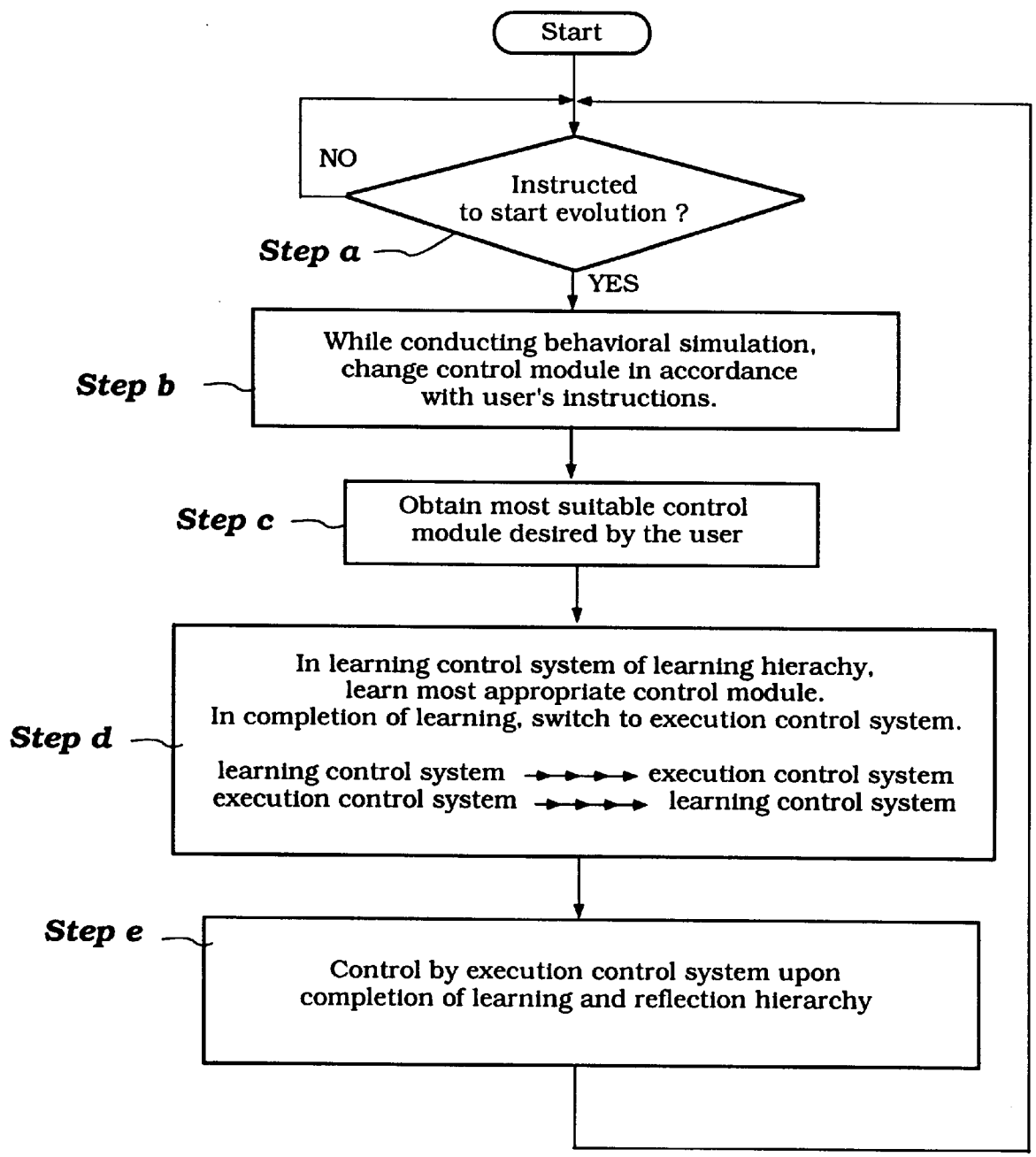
FIG. 2 is a flow chart of an evolutionary control system on a time basis, according to the present invention.

FIG. 2 is a flow chart of the evolutionary control system on a time basis.

In an initial state, it is determined whether or not a signal for initiating evolution is received from a user. When the signal of initiating evolution is received from the user, the following evolution-processing is activated (step a).

When receiving the signal of evolution-processing from the user, the evolution-simulation hierarchy generates several control modules for selection from the control modules of the evolution-fitness system at the evolution-processing unit, and behavioral simulation is conducted for each control module at the behavioral simulation unit. The outcome of the behavioral simulation is displayed on the display unit in a visual or auditory manner for the user. The user evaluates the control modules for selection based on the displayed outcome on the display unit, and selects a control module(s) for selection preferable to the user, thereby inputting the selection result (evaluation result) into the instruction input unit. The evaluation result by the user inputted into the instruction input unit is forwarded to the evaluation system of the evolution-processing unit, and the evaluation system causes the evolution-fitness system to further create control modules for selection, based on the evaluation result (step b).

By repeating step b in the evolution-simulation hierarchy, at least one control module most preferable which most conforms to the user's preference at the moment can be obtained (step c).

The control system for learning of the learning hierarchy learns the most preferable control module obtained in the evolution-simulation hierarchy, and upon completion of learning by the control system for learning, the control system for learning and the control system currently for operation are switched (step d). Thereafter, using the control system for learning, which currently completes learning, a basic compensation is determined based on the external information, thereby compensating for a control base value (step e). In the above, output of the learning hierarchy is set at zero at an initial state, i.e., control output is determined for the subject solely by the control base value of the reflection hierarchy in the beginning.

Combination of Evolution-Simulation and Evolution-Fitness

Figure 3:
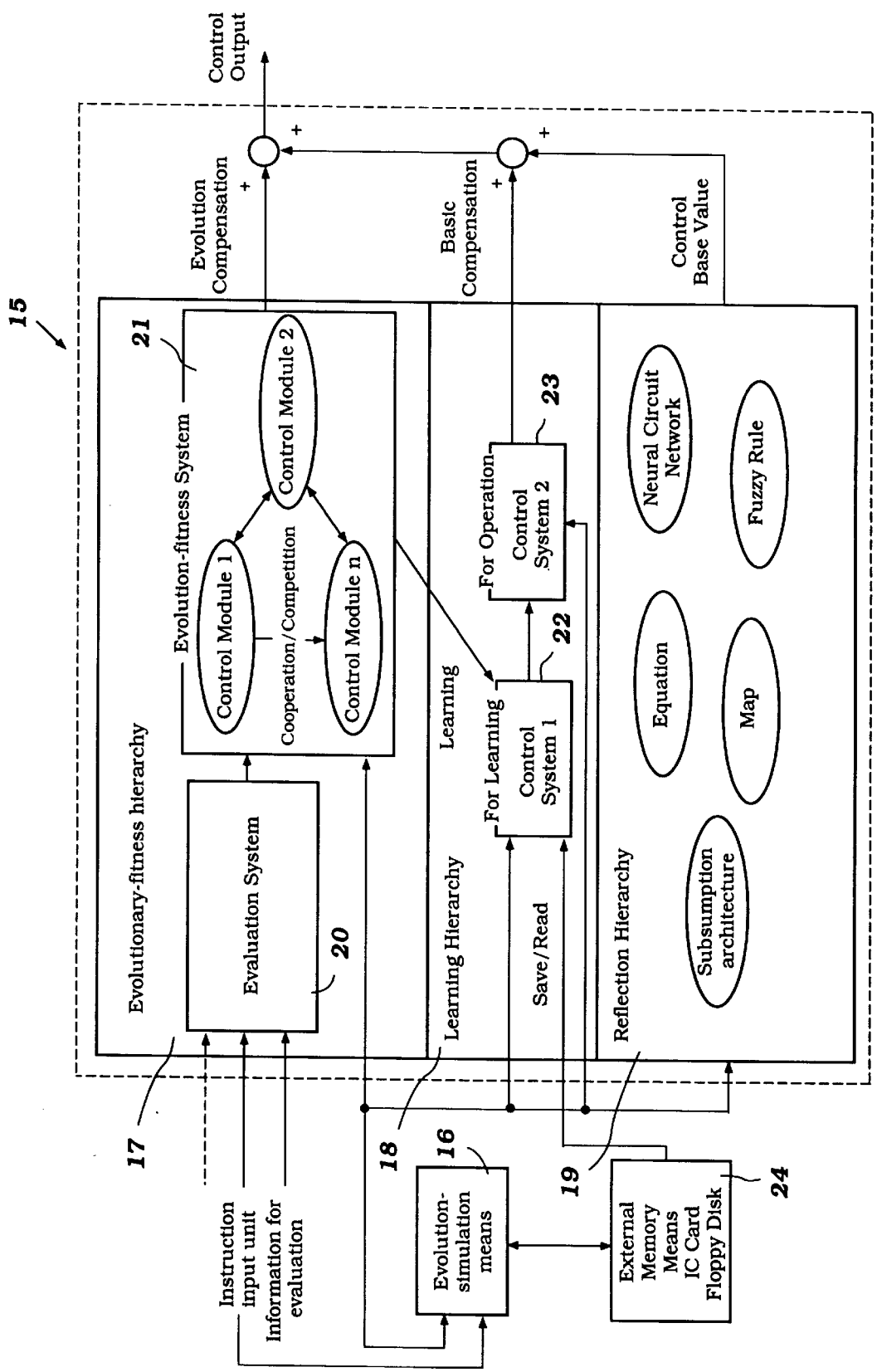
FIG. 3 illustrates a block diagram showing the basic principle of an evolutionary control system wherein an evolution-simulation means is used in combination with a control means for evaluating an evolution process through actual operation of the subject.

FIG. 3 illustrates a block diagram showing the basic principle of an evolutionary control system 15 wherein an evolution-simulation means 16 is used in combination with a control means for evaluating an evolution process through actual operation of the subject.

The control means of this embodiment has three hierarchies, i.e., an evolution-fitness fitness hierarchy 17, a learning heirarchy 18, and a reflection hierarchy 19.

The functions of the reflection hierarchy 19 and the learning hierarchy 18 are basically the same as those in the embodiment illustrated in FIGS. 1 and 2.

The evolution-fitness hierarchy 17 is comprised of an evaluation system 20 and an evolution-fitness system 21. Upon activation of the evolution-fitness hierarchy 17, the hierarchy receives instructions from the user or information for evaluating a user's preference at the evaluation system 20. The evolution-fitness system 21 creates several control modules for selection from control modules contained in the evolution-fitness system 21, in accordance with the user's instructions. The evolution-fitness hierarchy 17 actually operates the subject, using the control modules for selection, and an evaluation result of a behavioral outcome by the user is inputted into the evaluation system 20. According to the evaluation result, the control modules for selection are selected, and new control modules for selection are generated from the remaining control modules, using a genetic algorithm. By repeating the above processes, the evolution-fitness hierarchy 17 obtains a control module(s) most which conforms to the user's instructions at the moment, thereafter fixing the control modules in the evolution-fitness system 21 to the most suitable control module(s). The evolution-fitness hierarchy 17 then outputs a compensation (hereinafter referred to as an evolution compensation) using the fixed control module(s), thereby compensating for the control base value outputted from the reflection hierarchy 19. The control system for learning 22 in the learning hierarchy 18 learns the relationship of input and output of the evolution-fitness hierarchy 17 in combination with the relationship of input and output of the control system for operation 23 of the learning hierarchy 18 when fixed at the most suitable control module(s). During the above time period, control over the subject is conducted by the reflection hierarchy 19, the control system for operation 23 in the learning hierarchy, and the evolution-fitness hierarchy 17. In the above, the output from the learning hierarchy is set at zero. When the difference between the value, which is obtained by adding the output from the control system for learning 22 in the learning hierarchy 18 (hereinafter the output is referred to as "presumed compensation") to the control base value, and the value, which is the actual output (control base value + compensation outputted from the control system of the learning hierarchy 18, hereinafter referred to as "basic compensation", + evolution compensation), is smaller than a predetermined threshold, the learning in the learning hierarchy 18 is completed. The control system for learning and the control system for operation 23 are then switched over, i.e., the previous control system for learning 22 functions as a control system for operation 23 while the previous control system for operation 23 functions as a control system for learning 21. In this way, control is conducted by the reflection hierarchy 19 and the learning hierarchy 18.

After the evolution-fitness hierarchy 17 causes the learning hierarchy 18 to learn information related to the most preferable control module, the output from the evolution-fitness hierarchy 17 is fixed at zero, and thereafter, the evolution-fitness hierarchy 17 stands by until receiving a signal of initiating evolution from the user.

The evolution-simulation means 16 is constituted so as to have the same functions as the evolution-simulation hierarchy 4 described in FIGS. 1 and 2, based on the user's instructions.

According to the above structures, the user can choose evolution processes of the control modules either based on behavioral results from actual operation of the subject, or based on simulation results from behavioral simulation, thereby allowing for evolution control in accordance with the user's preference and environments.

Evolutionary Control System Adapted to Engine of Vehicle

In an embodiment, the subject to be controlled is an engine installed in vehicles or vessels. However, in the evolutionary control system of the present invention, no restriction is imposed on the type of machine to be controlled, and as with the engine, a robot used in machine tools, a motor used in electrically-driven vehicles, or the like can be controlled by adopting the evolutionary control system based on the same principle as in the engine.

Figure 4:
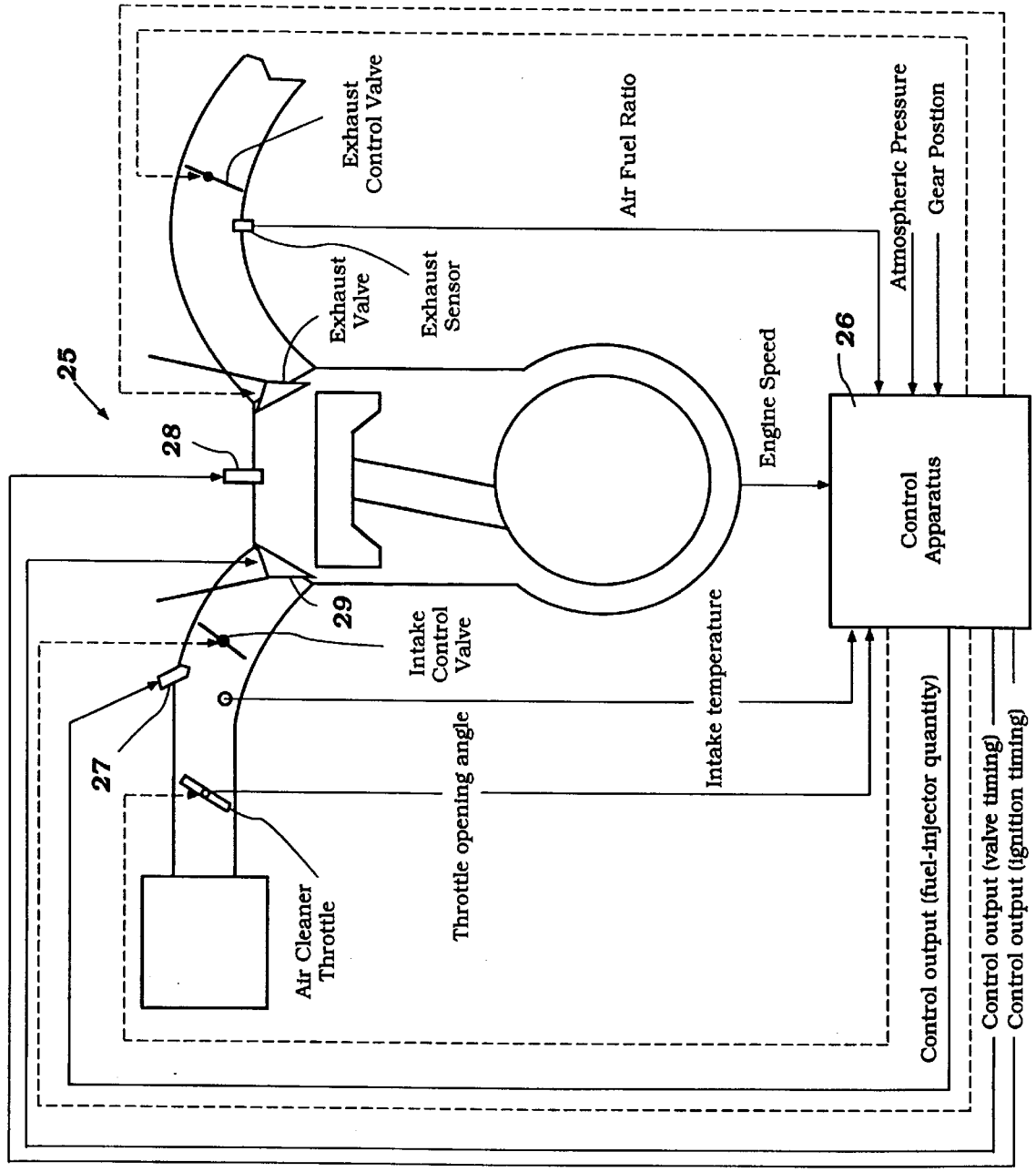
FIG. 4 is a schematic view showing the relationship between an engine and a control device performing the evolutionary control system of the present invention.

FIG. 4 is a schematic view showing the relationship between an engine 25 and a control device 10 performing the above-described evolutionary control system.

As shown in FIG. 4, the control system 26 controls the engine in such a way that fuel efficiency and acceleration performance are compatible with each other, by controlling the injection time period of an injector 27, the ignition timing of a ignition plug 28, and the valving timing of an intake valve 29, based on information input into the control device, such as the engine speed (r.p.m.), the degree of the throttle opening (angle), the atmospheric pressure, the intake temperature, the air-fuel ratio (A/F), and the driving speed.

Figure 5:
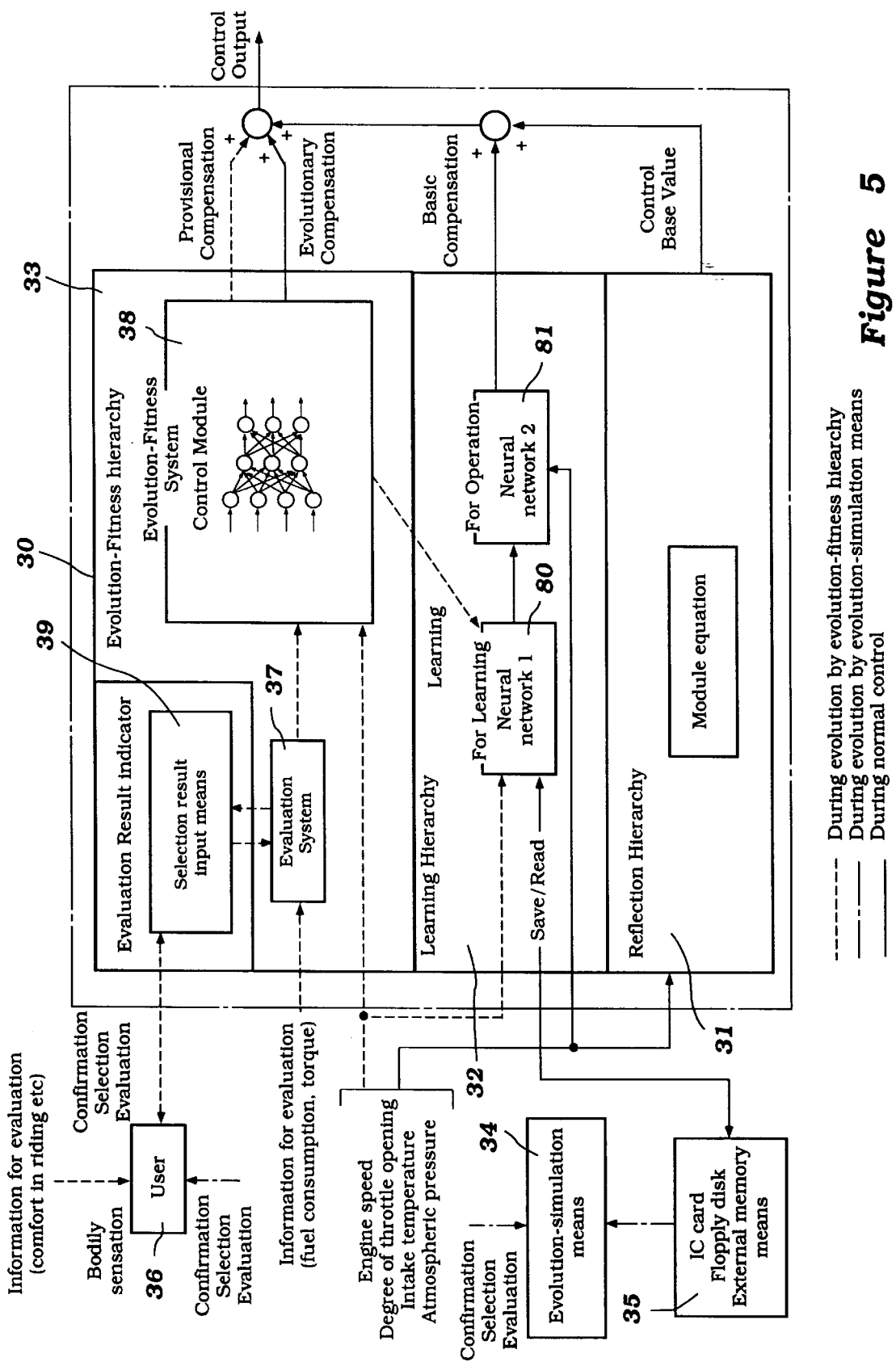
FIG. 5 is a schematic block diagram of a control unit used in an engine control system according to the present invention.

FIG. 5 is a schematic block diagram of the control system 26.

The control system 26 is comprised of a control device 30 comprised of the reflection hierarchy 31, the learning hierarchy 32, and the evolution-fitness hierarchy 33, an evolution-simulation means 34 performing the evolution process by behavioral simulation, and an external memory means 35, so that the user 36 can choose the evolution process either using the evolution control system of the control device 30 or using the evolution-simulation means 34.

Control Device Using Evolution-Fitness Hierarchy Adapted to Engine Control

As described above, the control device 30 is composed of the reflection hierarchy 31, the learning hierarchy 32, and the evolution-fitness hierarchy 33. The reflection hierarchy 31 receives signals such as those of the engine speed, the degree of the throttle opening, the intake temperature, and atmospheric pressure, and the reflection hierarchy 31 determines and outputs a control base value that controls the injection time period of the injector 3, the ignition timing of the ignition plug 28, and the valuing timing of the intake valve 29, using an equation formed by modeling numerical formulae obtained from the above input signals.

The evolution-simulation hierarchy 31 is comprised of an evaluation system 37 and an evolution-fitness system 38.

Figure 6:
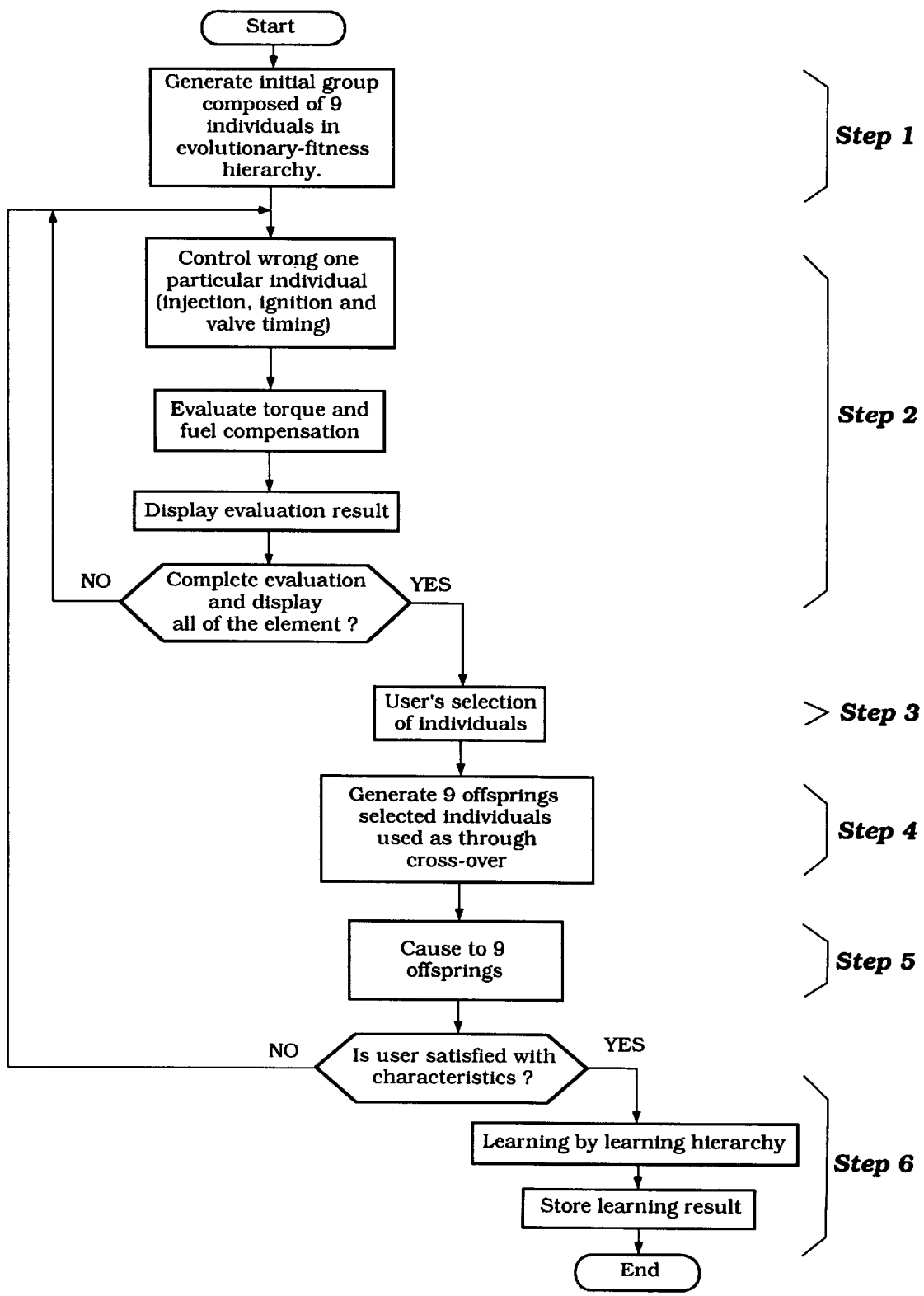
FIG. 6 is a flow chart showing a basic behavior of the evolution-simulation hierarchy according to the present invention.

FIG. 6 is a flow chart showing a basic behavior of the evolution-fitness hierarchy and the learning hierarchy. The basic behavior of the evolution-fitness hierarchy and the learning hierarchy will be explained with reference to this chart.

Step 1: Formation of Initial Population (First Generation)

Figure 7:
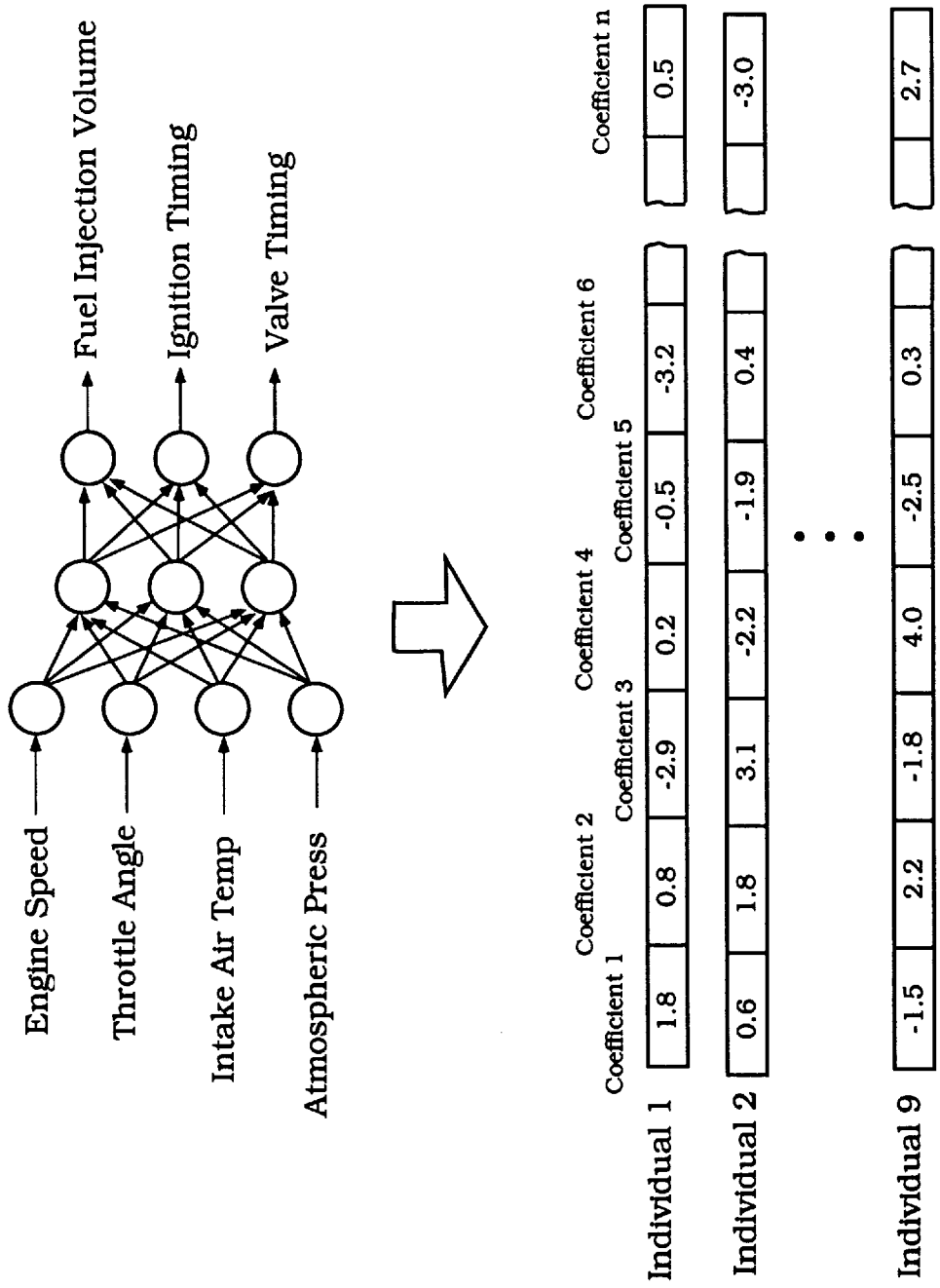
FIG. 7 is a schematic diagram showing an embodiment wherein a first generation is created, which is composed of multiple individuals (#1 to #9) encoded by coupling coefficients, used as genes, of the neural network which learns the relationship among various factors.

As shown in FIG. 7, the evolution-fitness hierarchy comprises at least one control module comprised of a hierarchical neural network of a four-input/three-output type, which neural network receives as input the engine speed, the degree of the throttle opening, the intake temperature, and atmospheric pressure, and outputs a compensation for the fuel-injection quantity, the ignition timing, and the valuing timing. When receiving a signal of to initiate evolution from the user, a first generation is created, which is composed of multiple individuals (nine individuals #1 to #9 in this embodiment) encoded by coupling coefficients, used as genes randomly assigned, of the neural network. Namely, a generation comprising plural chromosomes is created. In the above, one individual denotes one chromosome contained in a genetic algorithm. Initial values of the genes, i.e., the coupling coefficients, of each individual are randomly set in a predetermined range (e.g., approximately−10 to 10). In the above, by creating one individual having a gene value (coupling coefficient value) of zero, it is possible to avoid abating, in the process of evolution, the performance characteristics lower than those before evolution.

Step 2: Evaluation of Fitness

The fuel-injection quantity, the ignition timing, and the timing of the intake valve are controlled based on the value which is the sum of the outputs from the reflection hierarchy and the learning hierarchy and the output from the evolution-fitness hierarchy obtained using the coupling coefficients of the first individual (#1) of the first generation (hereinafter this output is referred to as "provisional compensation"). Provisional compensation Y, i.e., the output from the evolution-fitness hierarchy, can be obtained by actually inputting the engine speed, the degree of the throttle opening, the intake temperature, and atmospheric pressure at the moment, into the neural network in which the coupling coefficients of individual #1 are used, to determine output x of the neural network, and then determining provisional compensation Y by linear transformation of the output x using equation (1). In the above, the input information such as the engine speed are used after being normalized.

$$Y = 2*Gx - G \qquad (1)$$

wherein Y is a provisional compensation, x is an output from the neural network, and G is an output gain of the evolution-fitness hierarchy. By linear transformation of the output x of the neural network, the compensation outputted from the evolution-fitness hierarchy does not become extremely high, i.e., evolution progresses gradually as a whole. That is, an extreme change in engine behavior due to the evaluation or evolution is prevented.

Figure 8A:
FIG. 8 illustrates one example of a manner visually expressing the characteristics of each individual (chromosome). (a) shows that torque is high at low and intermediate speeds, but torque and fuel efficiency are low at a high speed. (b) shows that fuel efficiency is very good, but torque is low at any speed. (c) shows that both torque and fuel efficiency are reasonably good.
Figure 8B:
Figure 8C:

Evaluation information such as the air-fuel ratio and the engine speed is then inputted into the evaluation system after traveling for a while with the provisional compensation Y (derived from individual #1) being kept outputted from the evolution fitness hierarchy. In the evaluation system, based on this evaluation information, torque and fuel efficiency of the engine controlled using individual #1 are determined, and the properties regarding the torque and fuel efficiency of the individual are indicated on a display located near e.g., the meter units, in a manner shown in FIG. 8. (a) to (c) in this figure illustrate one example of a manner expressing the evaluation result of the individual. In each figure, the width of the square indicates the magnitude of torque, the color (light and shade) indicates the fuel efficiency, and the height divided into three portions shows the speed. The torque increases proportionally to the width, the fuel efficiency improves proportionally to the depth of the color (light and shade), and the upper, middle, and lower portions of the speed indicate high, intermediate, and low, respectively.

Figure 9:
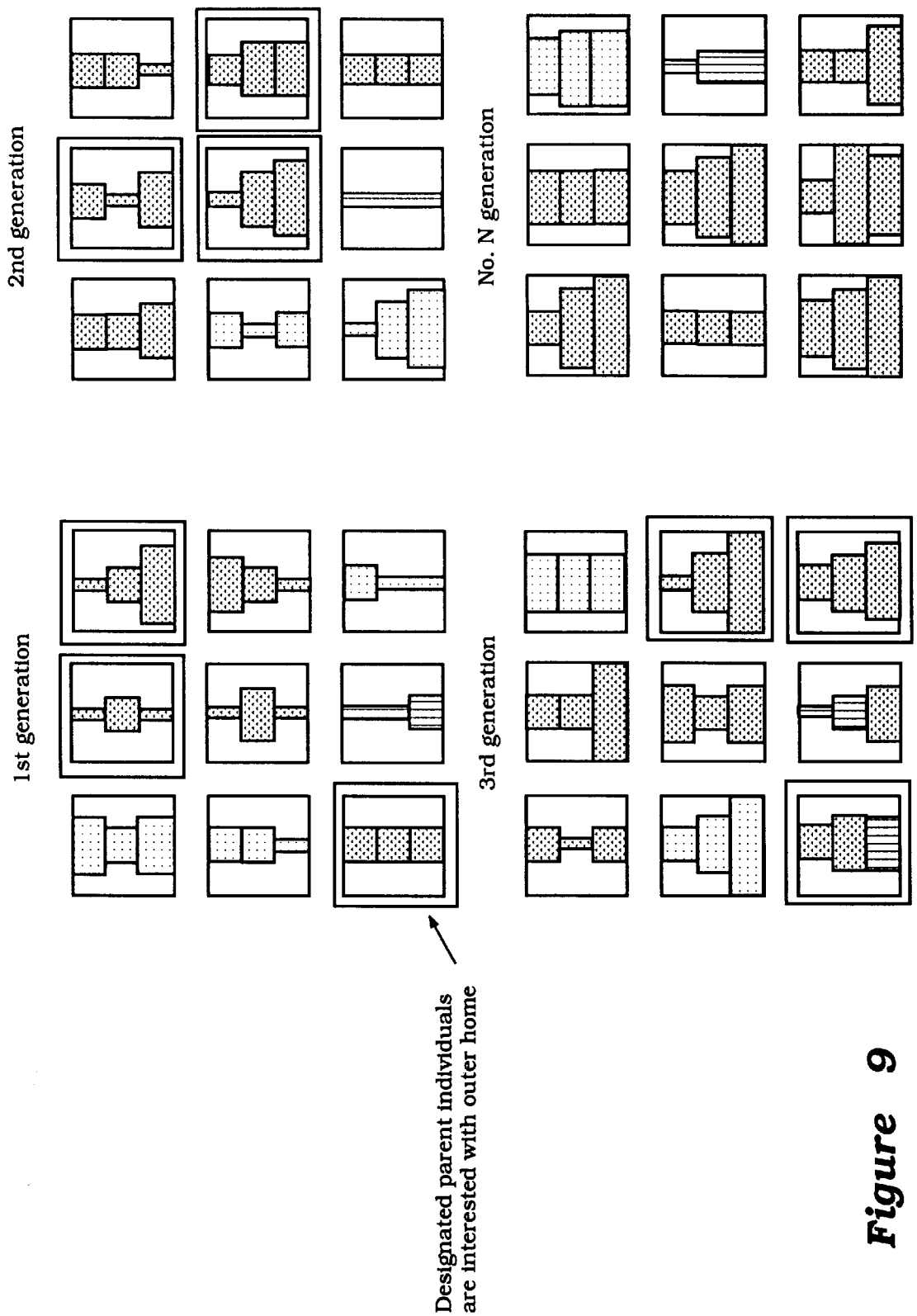
FIG. 9 illustrates one example of a manner visually expressing the characteristics of a population consisting of nine individuals (chromosomes).

The above evaluation of the individual is conducted on the population, i.e., all of the individuals of the first generation, and each individual's evaluation is indicated simultaneously on one display, as shown in FIG. 9.

Step 3: Evaluation and Selection by User

After completion of display of the all nine individuals' properties (individuals #1 to #9), control is switched once to an evaluation mode. In this mode, the user selects an individual successively from the nine individuals, and the evolution-fitness hierarchy conducts control by fixing the neural network at the coupling coefficient of the individual selected by the user, i.e., based on the selected individual. Accordingly, the user evaluates the characteristics of each of the nine individuals indicated on the display, based on whether or not it is comfortable to ride in during actual driving, i.e., the user evaluates the fitness of each individual based on the feeling of comfort.

After completion of evaluation of fitness of each individual based on the torque and fuel efficiency visually indicated on the display, as well as the degree of comfort in riding, the control mode is changed to a selection mode, thereby conducting selection of individuals of the first generation. This selection can be conducted by, for example, touching the display with a finger to select several individuals having the desired characteristics from the individuals of the first generation, as shown in FIG. 9 (see the first generation in FIG. 9). The selected individuals are designated as parent individuals and allowed to survive, and the remaining individuals are deleted (the designated parent individuals are indicated with an outer frame in FIG. 9).

Step 4: Cross-over

Figure 10:
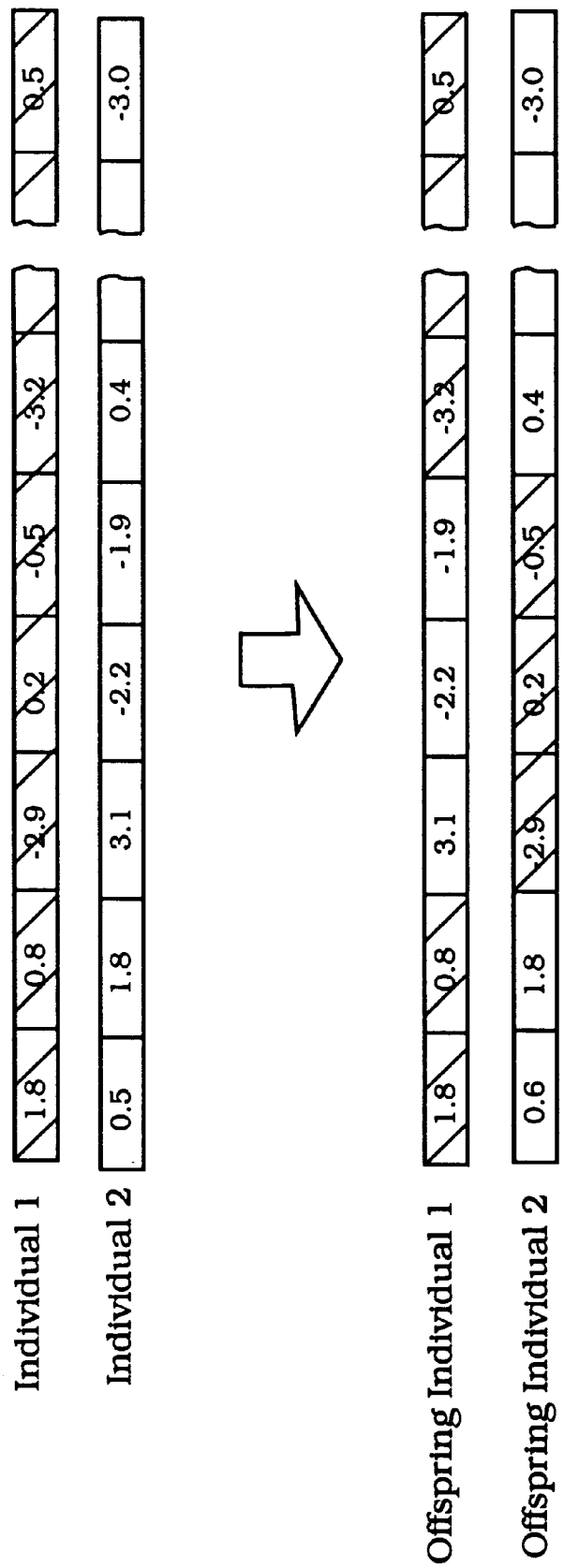
FIG. 10 illustrates the concept of cross-over between individuals (chromosomes).

After completion of selection of parent individuals by the user, two parent individuals are selected therefrom, using random numbers. Accordingly, two offspring individuals (children) are generated from the two parent individuals by performing cross-over processing (see FIG. 10). By repeating this step five times, nine individuals are generated (the tenth individual is discarded), i.e., a second generation is generated.

In the above, the cross-over between individuals may be single-point cross-over, double-point cross-over, or normal distribution cross-over.

The normal distribution cross-over is a method of creating offspring based on a rotation-symmetrical normal distribution with respect to an axis connecting the parents, using chromosomes expressed by the actual number (individuals). The standard deviation of the normal distribution are correlated with the distance between the parents in terms of the components in the direction of the main axis connecting the parents. Other components of the axis are made correlated with the distance between the line connecting the parents and a third parent sampled from the group. This cross-over method has an advantage that the characteristics of the parents are easily passed on to their offspring.

Step 5: Mutation

Figure 11:
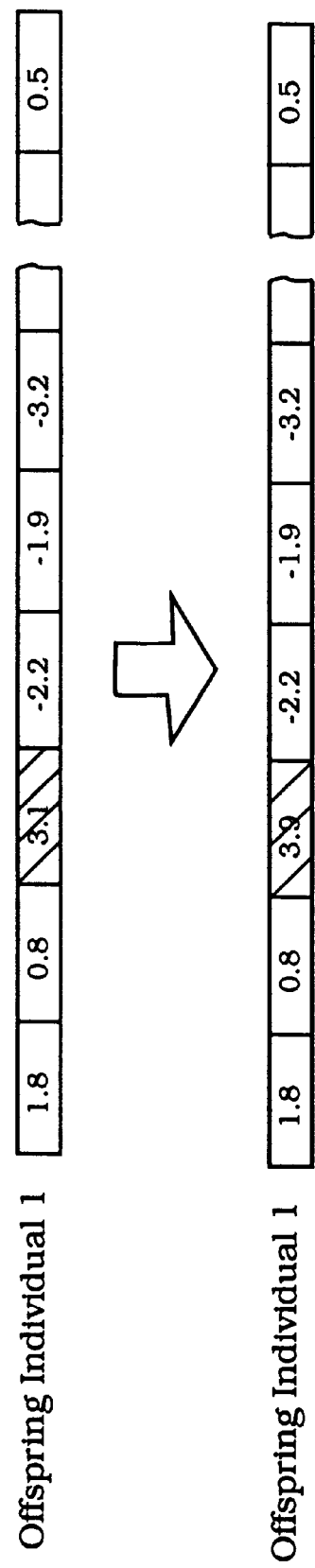
FIG. 11 illustrates the concept of mutation of an individual (chromosome).

After the creation of the nine offspring individuals, mutation of genes is caused in the created nine offspring by randomly changing the gene value (the degree of coupling) at a given probability (see FIG. 11).

Step 6: Learning and Preservation (Learning Hierarchy)

Steps 2 to 6 are repeated until an individual, which has the characteristics satisfying the user, is selected. When the individual satisfying the user is obtained, the user terminates the evolution process by designating the individual as the most preferable individual. After selection of the most preferable individual, the evolution-fitness hierarchy fixes the coupling coefficients of the neural network at those of the most preferable individual. After the neural network is fixed at the most preferable individual, the evolution-fitness hierarchy conducts control based on the evolution compensation for, for example, the actual engine speed outputted from the neural network.

Upon activating control based on the evolution compensation by the evolution-fitness hierarchy, the neural network for learning of the learning hierarchy undergoes learning the relationship between the input and output of the evolution-fitness hierarchy, in combination with the relationship between the input and output of the neural network functioning as a neural network for operation. Meanwhile, the output of the evolution-fitness hierarchy is derived from the individual which maximizes the previous evaluation equation, and thus, the control pattern does not change with time.

Figure 12:
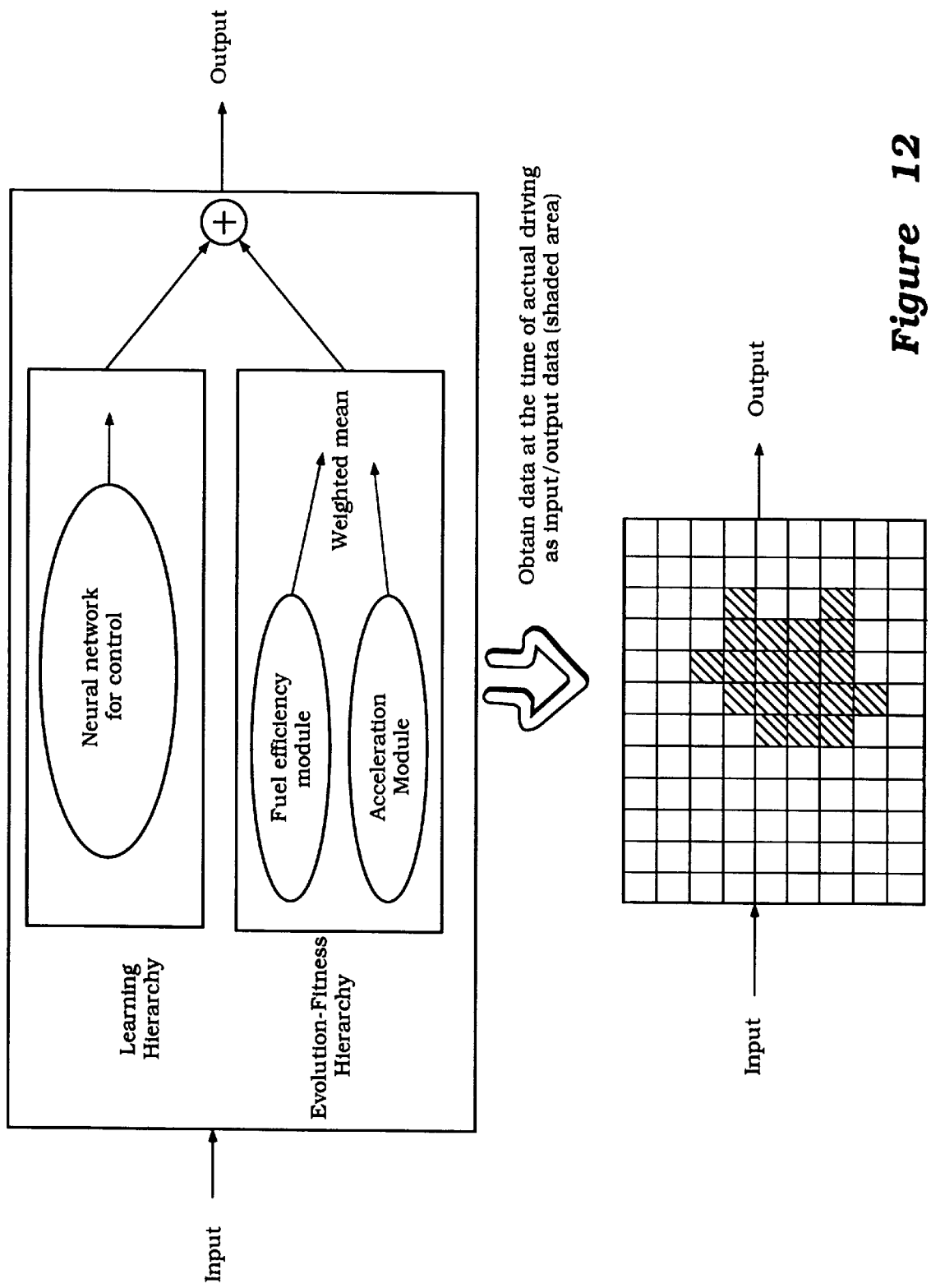
FIG. 12 is a diagram showing how to obtain input and output data to control the engine, which are the sum of actual data of operation, an evolution compensation, and a basic compensation.
Figure 13:
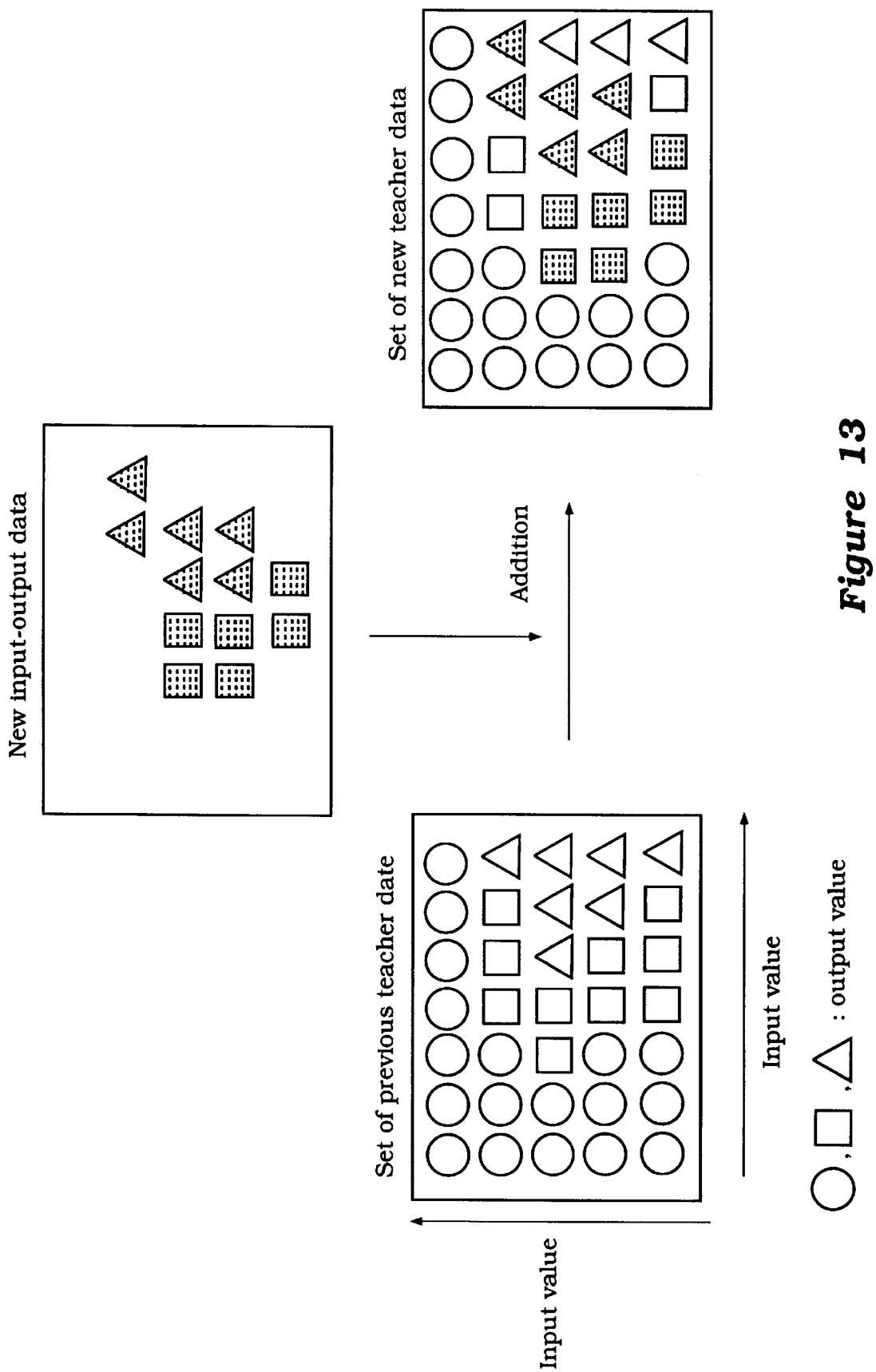
FIG. 13 is a diagram showing how to renew a set of teacher data, wherein old teacher data, whose Euclidean distance from the new data in a set of teacher data is less than a given value, are replaced with the new data.

The aforesaid learning, the input and output of the evolution-adaptation hierarchy, and the input and output of the neural network for learning of the learning hierarchy are averaged at a given step width to use data of the input and output to renew a set of educator data (teacher data). For example, if the average engine speed per second is 5,000 r.p.m.'s, the average degree of the throttle opening is 20, the average intake temperature is 28°C., and the average atmospheric pressure is 1013 hPa, the sum of these values and the output from the evolution-fitness hierarchy and the neural network for operation of the learning hierarchy (i.e., the evolution compensation and the basic compensation), is used as input and output data (see FIG. 12). The thus-obtained input and output data are added to the previous teacher data to obtain new teacher data. In the above, old teacher data, whose Euclidean distance from the new data in a set of teacher data is less than a given value, are deleted. This process is shown in FIG. 13. The initial values of a set of teacher data are set so as to output zero for all input data.

The learning hierarchy learns a coupling coefficient of the neural network for learning based on the renewed set of teacher data. The learning continues until a deviation between (a) a presumed control output, which is obtained from an output from the neural network for learning (i.e., presumed compensation) and a control base value from the reflection hierarchy, and (b) the actual control output, is less than a threshold. After completing the learning, the neural network for learning is switched to that for operation, while the neural network previously for operation is switched to that for learning. After this process, the learning hierarchy determines the basic compensation using the newly-obtained neural network for operation, and actually outputs the result. When the learning hierarchy functions as above, the output from the evolution-adaptation hierarchy is zero, i.e., control is conducted by the learning hierarchy and the reflection hierarchy.

The initial value of the neural network for operation in the learning hierarchy is set so as to output zero. Accordingly, in an initial state, control can be conducted only by the reflection hierarchy and the evolution-adaptation hierarchy.

The coupling coefficient of the neural network for operation which has completed learning can readably be saved in external memory means such as a floppy disk and an IC card. In this way, the characteristics of the most preferable individual once obtained by the evolution process can be resumed or retrieved. Accordingly, the user's preferred characteristics can immediately be realized in accordance with the driving area, the road conditions, or the feeling of the user at the moment.

In addition, the above-described evolution process of the control modules by using a genetic algorithm can be conducted as many times as the user wishes, simply by inputting a signal to initiate evolution.

Evolution-Simulation Means for Behavioral Simulation Adapted to Engine Control

The evolution-simulation means 34 will be explained.

Figure 14:
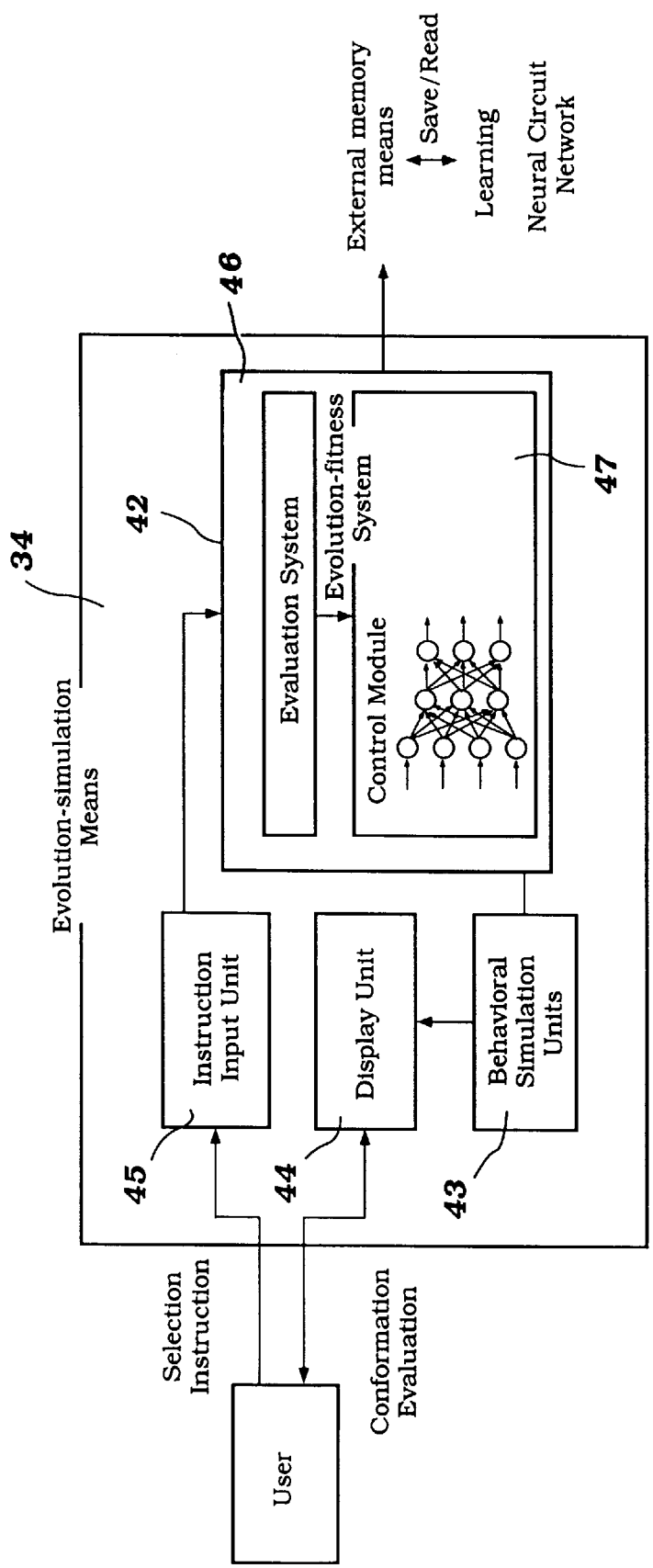
FIG. 14 is a diagram illustrating conceptual structures of an evolution-simulation means.

FIG. 14 a diagram illustrating conceptual structures of the evolution-simulation means 34. As shown in the figure, the evolution-simulation means 34 is composed of an evolution processing unit 42, a behavioral simulation unit 43, a display unit 44, and an instruction input unit 45. The evolution-processing unit 42 is composed of a evaluation system 46 and an evolution-fitness system 47. The evolution-fitness system 47 comprises at least one hierarchical neural network of a four-input/three-output type, which neural network receives as input the engine speed, the degree of the throttle opening, the intake temperature, and atmospheric pressure, and outputs a compensation for the fuel-injection quantity, the ignition timing, and the valuing timing (see FIG. 7).

Figure 15:
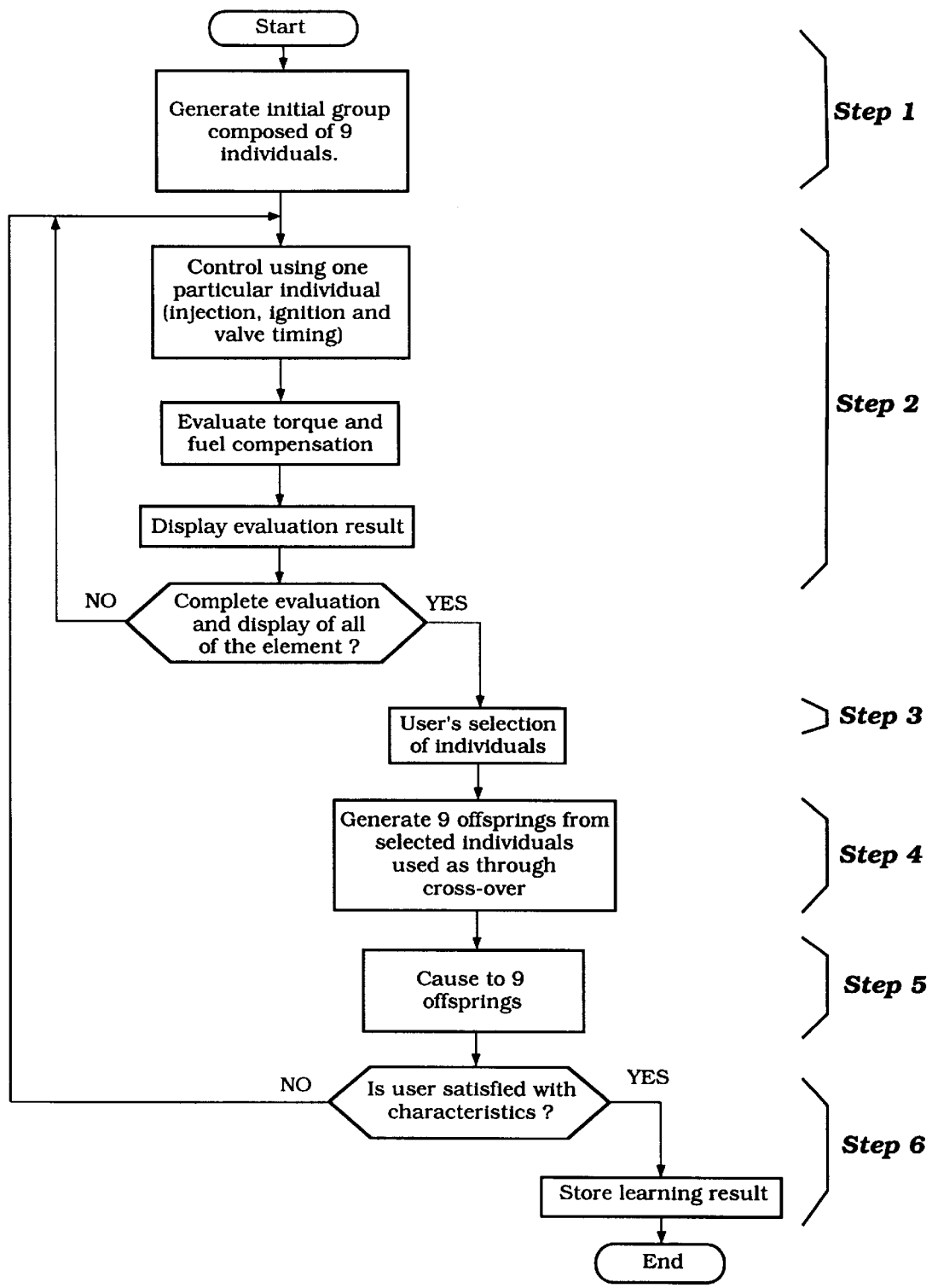
FIG. 15 is a flow chart showing a basic behavior of the evolution-simulation means.

FIG. 15 is a flow chart showing a basic behavior of the evolution-simulation means. The basic behavior of the evolution-simulation means will be explained with reference to this chart.

Step 1: Formation of Initial Population (First Generation)

When the evolution-fitness system of the evolution-processing unit receives a signal to initiate evolution from the user, a first generation is created, which is composed of multiple individuals (nine individuals #1 to #9 in this embodiment) encoded by coupling coefficients, used as genes randomly assigned, of the neural network. Namely, a generation comprising plural chromosomes is created. Initial values of the genes, i.e., the coupling coefficients, of each individual are randomly set in a predetermined range (e.g., approximately −10 to 10). In the above, by creating one individual having a gene value (coupling coefficient value) of zero, it is possible to avoid abating, in the process of evolution, the performance characteristics lower than those before evolution.

Step 2: Evaluation of Fitness

Control outputs (the fuel-injection quantity, the ignition timing, and the timing of the intake valve) are next calculated using the coupling coefficients of the first individual (#1) of the first generation. The calculated results are used as control parameters for the behavioral simulation unit, and driving simulation is activated, thereby determining torque and fuel efficiency. The individual is accordingly evaluated. The evaluation results are forwarded to the display unit which displays the characteristics of the torque and fuel efficiency in a manner shown in FIG. 8. The above evaluation of the individual is conducted on the population, i.e., all of the individuals of the first generation, and each individual's evaluation is indicated simultaneously on one display, as shown in FIG. 9.

Step 3: Evaluation and Selection by User

After completion of display of the all nine individuals' properties (individuals #1 to #9), selection of the individuals of the first generation is made by the user. This selection can be conducted by, for example, touching the display with a finger to select several individuals having the desired characteristics from the individuals of the first generation, as shown in FIG. 9 (see the first generation in FIG. 9). The selected individuals are designated as parent individuals and allowed to survive, and the remaining individuals are deleted (the designated parent individuals are indicated with an outer frame in FIG. 9).

Step 4: Cross-over

The selection results by the user are forwarded to the evolution-processing unit via the instruction input unit. The evaluation system of the evolution-processing unit selects two individuals from the parent individuals selected by the user, using random numbers, and generates two offspring individuals (children) from the two individuals by performing cross-over processing (see FIG. 10). By repeating this step five times, nine individuals are generated (the tenth individual is discarded), i.e., a second generation is generated.

In the above, the cross-over between individuals may be single-point cross-over, double-point cross-over, or normal distribution cross-over.

Step 5: Mutation

After the creation of the nine offspring individuals, mutation of genes is caused in the created nine offspring by randomly changing the gene value (the degree of coupling) at a given probability (see FIG. 11).

Step 6: Saved in Memory

Steps 2 to 6 are repeated until an individual, which has the characteristics satisfying the user, is selected. When the individual satisfying the user is obtained, the user terminates the evolution process by designating the individual as the most preferable individual.

The evolution-simulation means 34 allows the external memory means 35 to save in a memory the most preferable control module (evolved) adapted for the most suitable individual.

The learning hierarchy of the control device 30 reads as necessary the control module evolved using the evolution-simulation means 34, and causes the neural network for learning to learn control using the control module. Upon completion of learning, the neural network for learning is switched to the neural network for operation, thereafter performing operation using the neural network for operation based on the evolved control module.

The above control device 30 and the evolution-simulation means 34 conduct evolution processes in accordance with the user's instructions. That is, the user can choose evolution-processes of the control modules either based on behavioral results from actual operation of the subject, or based on simulation results from behavioral simulation, i.e., operating either the control device 30 or the evolution-simulation means 34.

Figure 16:
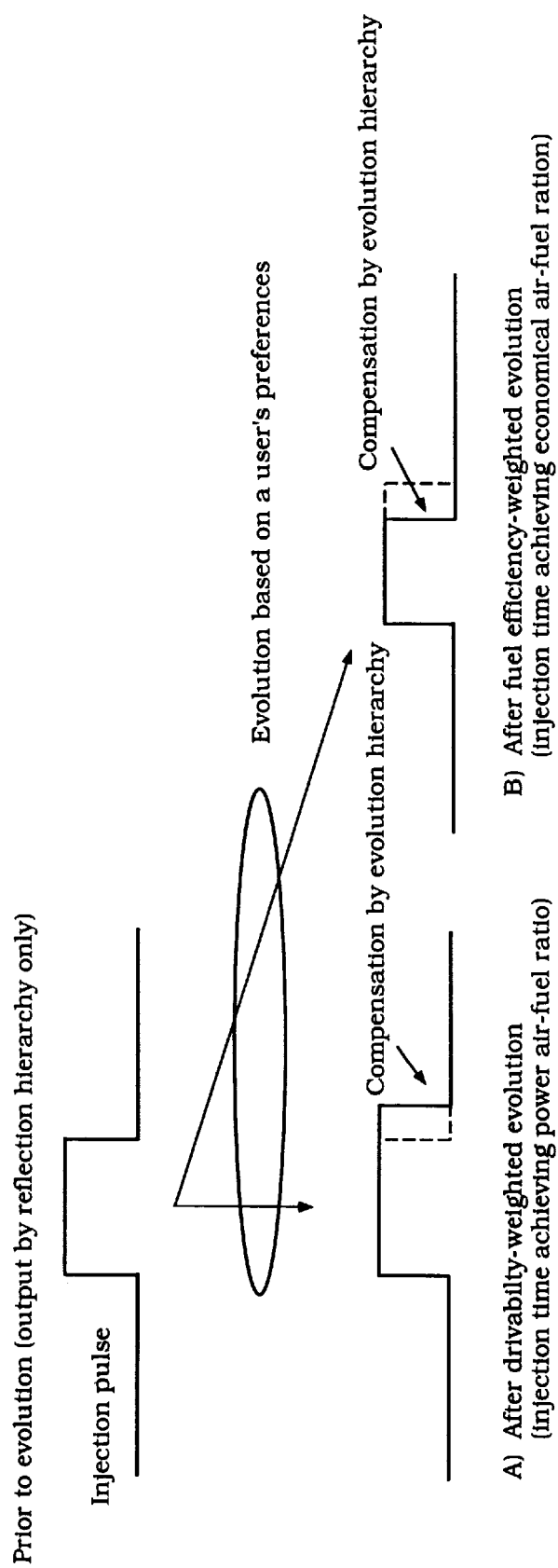
FIG. 16 illustrates a change in the control over injection impulses for an injector, for example, before and after the evolution process according to the present invention.

FIG. 16 is illustrates the change in the control over injection impulses for an injector, for example, before and after learning through the above evolution process conducted by the control device 30 or the evolution-simulation means 34. As shown in this figure, by the above evolution process, the engine is "trained" to suit the user's preference, e.g., a fuel efficiency-weighted type or a low-speed torque-weighted type.

Overall Features and Other Features

As described above, by installing the evolution-fitness hierarchy in the control device 30, and further by installing the evolution-simulation means 34 as an external device installed outside the control device 30, when the user performs evolution-processes, the user can choose evolution-processes of the control modules either based on behavioral results from actual operation of the subject, or based on simulation results from behavioral simulation, thereby allowing for evolution control in accordance with the user's preference and environments.

In addition, in the evolution-simulation means 34, evolution takes place without actual driving, thereby omitting the user's role in evaluating actual driving under conditions set by each individual (chromosome). Thus, evaluation can be highly facilitated.

Further, in the evolution-simulation means 34, evolution takes place using behavioral simulation, thereby allowing for evolution of the control system for environments under which the user has never driven the vehicle, by predicting appropriate control.

Further, by using the evolution-simulation means 34, it is possible to adapt an engine control system, which has been evolved by another user, to the user's vehicle, thereby diversifying characteristics of control.

Figure 17:
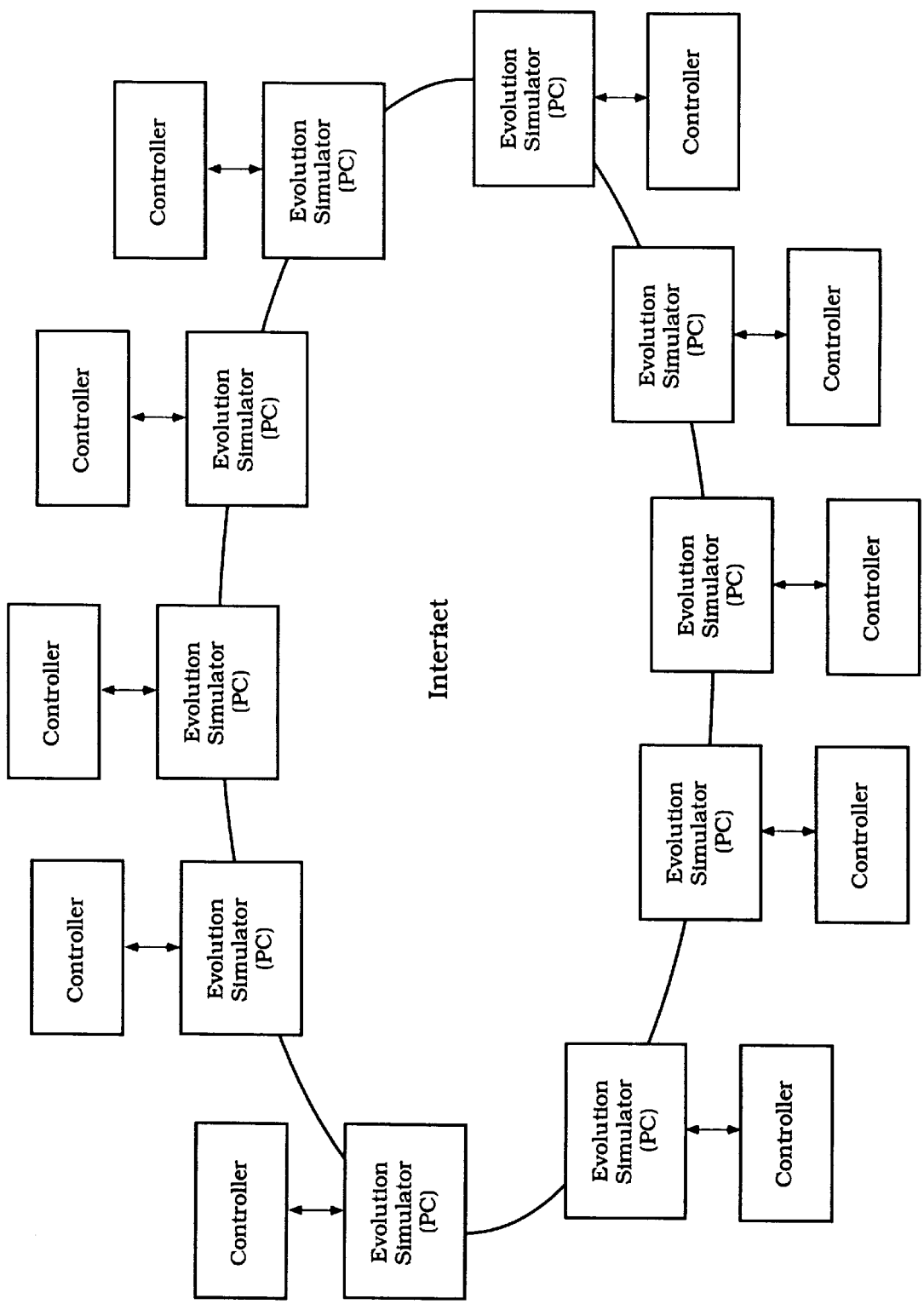
FIG. 17 illustrates an evaluating process to evaluate fitness of individuals by conducting parallel processing of each individual by linking other evolution-simulation means via a communication network (the internet).

As another aspect of using the evolution-simulation means 34, it is possible to increase the processing speed of evaluating fitness of individuals at the evolutionsimulation means, by conducting parallel processing of each individual by linking other evolution-simulation means via a communication network such as the internet as shown in FIG. 17. By linking plural evolution-simulation means, the number of individuals increases, thereby improving diversity of individuals, leading to better evolution. The evolution-simulation means may be constructed by a specific device exclusively used therefor, or may be constituted by a personal computer (PC) containing an appropriate simulation software program. When using a PC for the evolution-simulation means, the use of a costly specially-designed device can be eliminated.

In the aforesaid example, the subject of the evolutionary control system is an engine for a vehicle. However, the subject of the evolutionary control system is not limited to an engine, and can be any given control such as control over the characteristics of a damper of a suspension or sheet for a vehicle, or control over the assist characteristics of an auxiliary drive of a bicycle or wheelchair equipped with an electrical motor or engine, or control over the behavioral characteristics of a personal robot (brisk behavior or tranquil behavior).

Further, in the aforesaid example, as control output, the injection time period, the ignition timing, and the timing of intake valuing are used. However, in addition to the above, control output for controlling an engine can be the degree of the electric throttle opening, the timing of activation of intake and exhaust valves, the degree of valve lift, the timing of activation of intake and exhaust control valves, or the like (see FIG. 4). In the above, the intake control valve is a valve provided in an intake pipe in order to control a tumbler and swirl. The exhaust control valve is a valve provided in an exhaust pipe in order to control exhaust pulsation.

Further, in the aforesaid example, the leaning hierarchy is comprised of a hierarchical neural network. However, the basic structure of the control system of the learning hierarchy is not limited to the above, and for example, a CMAC (Cerebellar Model Arithmetic Computer) can be used. The CMAC is excellent in terms of additional learning and the high speed of learning, as compared with the hierarchical neural network.

Further, in the aforesaid example, the evolution-simulation hierarchy is provided as an external device. However, the hierarchy is not limited to the above, and for example, it can be included in the control means comprised of the reflection hierarchy, the learning hierarchy, and the evolution-fitness hierarchy.

Moreover, in the aforesaid example, the user conducts evolution processes through selection of chromosomes, using a genetic algorithm. However, a person conducting evolution is not limited to the user, and for example, a manufacturer of the subject such as an engine can conduct evolution upon request from the user, as can a dealer or a manufacturer independently prior to sale.

It will be understood by those of skill in the art that numerous variations and modifications can be made without departing from the spirit of the present invention. Therefore, it should be clearly understood that the forms of the present invention are illustrative only and are not intended to limit the scope of the present invention.

What is claimed is:

1. A method for adapting operation of a drive unit specifically to an individual user who manipulates output of the drive unit, said drive unit being operable by an operation signal outputted from a control unit when receiving a pre-selected signal including a signal from the user, said method comprising the steps of:

(a) providing a computer simulation of the drive unit, said simulation simulating drive unit operation and comprising a drive unit simulation and a control unit simulation programmed to formulate plural control modules, each outputting an operation signal for operating the drive unit when receiving a pre-selected signal including a signal from the user;

(b) operating, by the user, the simulation by the steps of:

(i) formulating multiple control modules under predetermined rules;

(ii) inputting to the multiple control modules a pre-selected signal including a signal from the user to output from each control module an operation signal into the drive unit simulation;

(iii) manipulating output of the drive unit simulation by the user;

(iv) selecting at least one control module from the multiple control modules, which is adaptive to the user's manipulation pattern;

(v) formulating subsequent multiple control modules based on the selected control module(s), if the selected control module is not final; and (vi) repeating steps (ii) through (v) until the drive unit simulation is operated adaptively to the user, wherein a finally selected control module is obtained;

(c) saving the finally selected control module in a memory; and (d) operating, by said user, said drive unit using the control module which retrieves the finally selected module from the memory, wherein the drive unit is operated adaptively to the user.

2. The method according to claim 1, wherein said memory is an IC card or a floppy disc which is detachable from the control unit simulation and is attachable to the control unit of the drive unit.

3. The method according to claim 1, wherein said simulation is constituted by a communication network composed of plural external devices.

4. The method according to claim 1, wherein said drive unit is a motor for a vehicle.

5. The method according to claim 1, wherein the input-output relationship of each control module is regulated by parameters, and in step (v), the multiple control modules are formulated by genetic algorithms wherein the parameters are used as genes.

6. The method according to claim 1, wherein said control unit of said drive unit is programmed to formulate plural control modules, each outputting an operation signal for operating the drive unit when receiving a pre-selected signal including a signal from the user; said method further comprising the steps of:

(e) while operating said drive unit after step (d), formulating multiple control modules under predetermined rules;

(f) inputting to the multiple control modules a pre-selected signal including a signal from the user to output from each control module an operation signal into the drive unit;

(g) manipulating output of the drive unit by the user;

(h) real-time selecting at least one control module from the multiple control modules, which is adaptive to the user's manipulation pattern;

(i) formulating subsequent multiple control modules based on the selected control module(s), if the selected control module is not final; and (j) repeating steps (f) through (i) until the drive unit is operated adaptively to the user, wherein a finally selected control module is obtained.

* * * * *